United States Patent
Jnawali et al.

(10) Patent No.: US 12,260,526 B2
(45) Date of Patent: Mar. 25, 2025

(54) SELF-EMITTING DISPLAY (SED) BURN-IN PREVENTION BASED ON STATIONARY LUMINANCE REDUCTION

(71) Applicant: SAMSUNG ELECTRONICS CO., LTD., Suwon-si (KR)

(72) Inventors: Kamal Jnawali, Tustin, CA (US); Joonsoo Kim, Irvine, CA (US); Chenguang Liu, Tustin, CA (US); Chang Su, Foothill Ranch, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 17/818,681

(22) Filed: Aug. 9, 2022

(65) Prior Publication Data
US 2023/0050664 A1 Feb. 16, 2023

Related U.S. Application Data

(60) Provisional application No. 63/232,869, filed on Aug. 13, 2021.

(51) Int. Cl.
G06T 5/70 (2024.01)
G06T 5/80 (2024.01)

(52) U.S. Cl.
CPC ............. G06T 5/70 (2024.01); G06T 5/80 (2024.01); *G06T 2207/20024* (2013.01)

(58) Field of Classification Search
CPC .... G06T 5/70; G06T 5/80; G06T 2207/20024
See application file for complete search history.

(56) References Cited

U.S. PATENT DOCUMENTS

| | | | |
|---|---|---|---|
| 7,336,707 B2 | 2/2008 | Kim | |
| 8,659,617 B2 | 2/2014 | Cho et al. | |
| 8,731,246 B2 | 5/2014 | Yamamoto et al. | |
| 8,743,291 B2 | 6/2014 | Li et al. | |

(Continued)

FOREIGN PATENT DOCUMENTS

| | | |
|---|---|---|
| CN | 102625028 B | 9/2016 |
| CN | 110599418 A | 12/2019 |

(Continued)

OTHER PUBLICATIONS

U.S. Corrected Notice of Allowability for U.S. Appl. No. 18/143,266 mailed Apr. 3, 2024.

(Continued)

*Primary Examiner* — David Perlman
(74) *Attorney, Agent, or Firm* — SHERMAN IP LLP; Kenneth L. Sherman; Steven Laut

(57) ABSTRACT

One embodiment provides a computer-implemented method that includes providing a dynamic list structure that stores one or more detected object bounding boxes. Temporal analysis is applied that updates the dynamic list structure with object validation to reduce temporal artifacts. A two-dimensional (2D) buffer is utilized to store a luminance reduction ratio of a whole video frame. The luminance reduction ratio is applied to each pixel in the whole video frame based on the 2D buffer. One or more spatial smoothing filters are applied to the 2D buffer to reduce a likelihood of one or more spatial artifacts occurring in a luminance reduced region.

20 Claims, 14 Drawing Sheets
(13 of 14 Drawing Sheet(s) Filed in Color)

(56) References Cited

U.S. PATENT DOCUMENTS

| | | | |
|---|---|---|---|
| 8,872,836 | B2 | 10/2014 | Rabii |
| 8,982,963 | B2 | 3/2015 | Gish et al. |
| 9,418,591 | B2 | 8/2016 | Kim et al. |
| 9,691,353 | B2 | 6/2017 | Joo et al. |
| 10,018,826 | B2 | 7/2018 | Nakatsuka |
| 10,354,575 | B2 | 7/2019 | Yang et al. |
| 10,402,952 | B2 | 9/2019 | Baar et al. |
| 10,657,631 | B2 | 5/2020 | Yip et al. |
| 10,706,774 | B2 | 7/2020 | Lee |
| 10,741,119 | B2 | 8/2020 | Zeng et al. |
| 10,885,384 | B2 | 1/2021 | Michael et al. |
| 11,006,151 | B2 | 5/2021 | Olivier et al. |
| 11,127,372 | B2 | 9/2021 | Kim et al. |
| 11,176,646 | B2 | 11/2021 | Tao et al. |
| 11,217,164 | B2 | 1/2022 | Kim et al. |
| 11,301,967 | B2 | 4/2022 | Peri et al. |
| 11,574,408 | B2 | 2/2023 | Bao et al. |
| 11,600,072 | B2 | 3/2023 | Russo et al. |
| 2007/0236410 | A1* | 10/2007 | Shimizu .................. H04N 3/20 345/20 |
| 2008/0111886 | A1 | 5/2008 | Bai |
| 2011/0090959 | A1 | 4/2011 | Weigand et al. |
| 2016/0200254 | A1 | 7/2016 | Raab |
| 2019/0082138 | A1 | 3/2019 | Pan et al. |
| 2019/0236761 | A1 | 8/2019 | Cauvin et al. |
| 2019/0238895 | A1 | 8/2019 | Thoreau et al. |
| 2019/0349607 | A1 | 11/2019 | Kadu et al. |
| 2020/0020303 | A1 | 1/2020 | Kim et al. |
| 2020/0090301 | A1 | 3/2020 | Kim et al. |
| 2020/0320672 | A1 | 10/2020 | Guermoud et al. |
| 2020/0372860 | A1 | 11/2020 | Kim et al. |
| 2020/0394772 | A1 | 12/2020 | Afra |
| 2021/0150812 | A1 | 5/2021 | Su et al. |
| 2021/0166360 | A1 | 6/2021 | Kim et al. |
| 2022/0020319 | A1 | 1/2022 | Lee |
| 2022/0028355 | A1 | 1/2022 | Chun et al. |
| 2023/0047673 | A1 | 2/2023 | Kim et al. |
| 2023/0059233 | A1 | 2/2023 | Kim et al. |
| 2023/0127327 | A1 | 4/2023 | Abdelhamed et al. |
| 2023/0351562 | A1 | 11/2023 | Zhao et al. |
| 2023/0360595 | A1 | 11/2023 | Jnawali et al. |
| 2024/0221134 | A1 | 7/2024 | Zhao et al. |

FOREIGN PATENT DOCUMENTS

| | | | |
|---|---|---|---|
| CN | 111050224 | A | 4/2020 |
| EP | 1772849 | B1 | 8/2012 |
| KR | 10-2017-0037783 | A | 4/2017 |
| KR | 10-2017-0049241 | A | 5/2017 |
| KR | 10-2019-0019438 | A | 2/2019 |
| KR | 10-2019-0053036 | A | 5/2019 |
| KR | 10-2020-0078293 | A | 7/2020 |
| KR | 10-2279373 | B1 | 7/2021 |
| KR | 10-2337829 | B1 | 12/2021 |
| KR | 10-2348028 | B1 | 1/2022 |

OTHER PUBLICATIONS

U.S. Non-Final Office Action for U.S. Appl. No. 18/143,266 mailed Jan. 3, 2024.

U.S. Notice of Allowance for U.S. Appl. No. 17/818,679 mailed Jul. 29, 2024.

U.S. Non-Final Office Action for U.S. Appl. No. 17/818,679 mailed Feb. 13, 2024.

U.S. Corrected Notice of Allowability for U.S. Appl. No. 18/143,266 mailed May 17, 2024.

Cozar, J.R., et al. "Logotype detection to support semantic-based video annotation." Signal Processing: Image Communication, Aug. 2007, pp. 669-679, vol. 22, Issues 7-8, Elsevier B.V., Netherlands.

Oh, E., et al. "49-2: Hierarchical Logo Detection and Image Processing Algorithm for Preventing OLED Image Sticking." SID Symposium Digest of Technical Papers, May 30, 2018, pp. 643-646, vol. 49. No. 1, Wiley Press Room, United States.

Shin, Y.G., et al., "A novel burn-in potential region detection method using image processing technique", IEEE International Conference on Consumer Electronics (ICCE), Jan. 8, 2017, pp. 215-216, IEEE, United States.

U.S. Advisory Action for U.S. Appl. No. 17/818,679 mailed Jan. 17, 2024.

International Search Report and Written Opinion dated Nov. 14, 2022 for International Application PCT/KR2022/012147, from Korean Intellectual Property Office, pp. 1-11, Republic of Korea.

Ahn, W. et al., "Flat-region detection and false contour removal in the digital TV display." 2005 IEEE International Conference on Multimedia and Expo, 2005, pp. 1-4, IEEE, United States.

Oh, E., et al. "Hierarchical Logo Detection and Image Processing Algorithm for Preventing OLED Image Sticking." SID Symposium Digest of Technical Papers, 2018, p. 643-646, vol. 49. No. 1, United States.

Shin, H-K, et al. "A luminance control method for OLED burn-in prevention using user information." 2022 IEEE International Conference on Consumer Electronics, 2022, pp. 1-2, IEEE, United States.

U.S. Non-Final Office Action for U.S. Appl. No. 17/818,679 mailed May 9, 2023.

Society of Motion Picture and Television Engineers, "D-Cinema Quality—Reference Projector and Environment", Apr. 6, 2011, RP 431-2:2011, New York {Abstract Only}.

International Telecommunications Union, "Parameter Values for Ultra-High Definition Television Systems for Production and International Programme Exchange", ITU-R rec. BT.2020-1,"Parameter Values for Ultra-High Definition Television Systems for Production and International Programme Exchange", Jun. 2014, pp. 1-8, Geneva, CH.

Kovaleski, R. et al., "High-quality reverse tone mapping for a wide range of exposures," SIBGRAPI, Aug. 26, 2014, pp. 49-56, United States.

Masia, B. et al., "Dynamic range expansion based on image statistics," Multimedia Tools and Applications, Jan. 2017, pp. 631-648, vol. 76, No. 1, United States.

Huo, Y. et al., "Physiological inverse tone mapping based on retina response," The Visual Computer, May 2014, pp. 507-517, vol. 30, No. 5, Springer {Abstract Only}.

Yang, X. et al. "Image correction via deep reciprocating HDR transformation," in Proceedings of the IEEE Conference on Computer Vision and Pattern Recognition (CVPR), Jun. 2018, pp. 1798-1807, IEEE, United States.

Kim, S. et al., "Learning the inverse tone mapping from low dynamic range video to high dynamic range displays using convolutional neural networks," Proceedings of the Asian Conference on Computer Vision (ACCV), Dec. 2, 2018, pp. 395-409, Springer, {Abstract Only}.

Kim, S. et al., "Deep SR-ITM: Joint learning of super-resolution and inverse tone-mapping for 4K UHD HDR applications," Proceedings of IEEE International Conference on Computer Vision (ICCV), 2019, pp. 3116-3125, IEEE, United States {Abstract Only}.

Wang, C. et al., "Deep inverse tone mapping for compressed images," IEEE Access, Jun. 5, 2019, pp. 74558-74569, vol. 7, IEEE, United States.

Eilertsen, G. et al., "HDR image reconstruction from a single exposure using deep Cnns," ACM Transactions on Graphics, Nov. 2017, pp. 1-15, vol. 36, No. 6, United States.

Santos, M. et al., "Single image HDR reconstruction using a CNN with masked features and perceptual loss," ACM Transactions on Graphics, Jul. 2020, ppl. 1-10, vol. 39, No. 4, United States.

Ronneberger, O., et al., "U-net: Convolutional networks for biomedical image segmentation," in MICCAI, Oct. 5, 2015, pp. 234-241, Springer International Publishing Switzerland.

International Telecommunications Union, "Reference Electro-Optical Transfer Function for Flat Panel Displays used in HDTV Studio Production", Mar. 2011, pp. 1-7, Recommendation ITU-R BT.1886, Geneva, CH.

Glorot, X. et al., "Deep sparse rectifier neural networks," Proceedings of the Fourteenth International Conference on Artificial Intelligence and Statistics, 2011, pp. 315-323, v. 15, United States.

(56) References Cited

OTHER PUBLICATIONS

Clevert, D-A, et al., "Fast and accurate deep network learning by exponential linear units (ELUs)," ParXiv preprint arXiv:1511.07289, Nov. 23, 2015, pp. 1-14, United States.

Dang-Nguyen, DT., et al., "Raise: A raw images dataset for digital image forensics," in Proceedings of the 6th ACM Multimedia Systems Conference, 2015, MMSys '15, p. 219-224, Association for Computing Machinery, New York, NY, United States, {Abstract Only}.

Wang, Z. et al., "Image quality assessment: from error visibility to structural similarity," IEEE Transactions on Image Processing, Apr. 2004, pp. 600-612, vol. 13, No. 4, IEEE, United States.

Banterle, F. et al., "Advanced High Dynamic Range Imaging", (2nd Edition), Jul. 2017, AK Peters (CRC Press), Natick, MA, USA.

Mantiuk, R. et al., "HDR-VDP-2: A calibrated visual metric for visibility and quality predictions in all luminance conditions", ACM Transactions on Graphics, Jul. 2011, pp. 40:1-40:13, vol. 30, No. 4, ACM.

International Search Report and Written Opinion dated Nov. 18, 2022 for International Application PCT/KR2022/012361, from Korean Intellectual Property Office, pp. 1-10, Republic of Korea.

U.S. Final Office Action for U.S. Appl. No. 17/818,679 mailed Oct. 3, 2023.

U.S. Notice of Allowance for U.S. Appl. No. 18/143,266 mailed Mar. 27, 2024.

U.S. Corrected Notice of Allowability for U.S. Appl. No. 17/818,679 mailed Oct. 17, 2024.

Extended European Search Report dated Sep. 4, 2024 for EP Patent Application No. 22856304.5, from European Patent Office, pp. 1-8, Germany.

Kim, D-E., et al., "Learning-Based Low-Complexity Reverse Tone Mapping With Linear Mapping", IEEE Transactions On Circuits and Systems for Video Technology, Feb. 2, 2020, pp. 1-4, vol. 30, IEEE, United States {Abstract Only}.

Marnerides, D., et al., "Expand Net: A Deep Convolutional Neural Network for High Dynamic Range Expansion from Low Dynamic Range Content", Computer Graphics Technology, May 22, 2018, pp. 1-13, vol. 30, No. 2, John Wiley & Sons Ltd., New Jersey.

U.S. Non-Final Office Action for U.S. Appl. No. 17/820,187 mailed Nov. 14, 2024 by Examiner Alejandro Hernandez.

U.S. Corrected Notice of Allowability for U.S. Appl. No. 17/818,679 mailed Dec. 20, 2024 by Examiner Bipin Gyawali.

\* cited by examiner

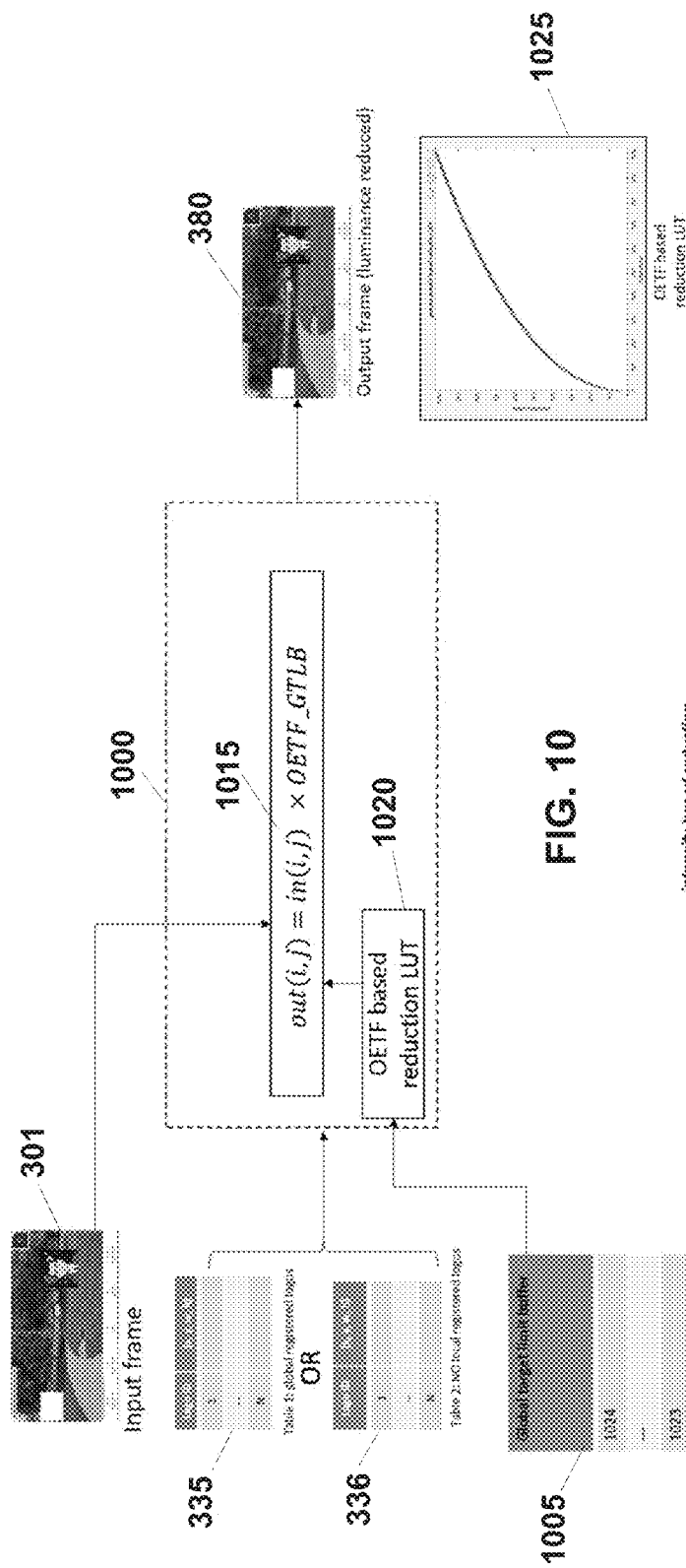
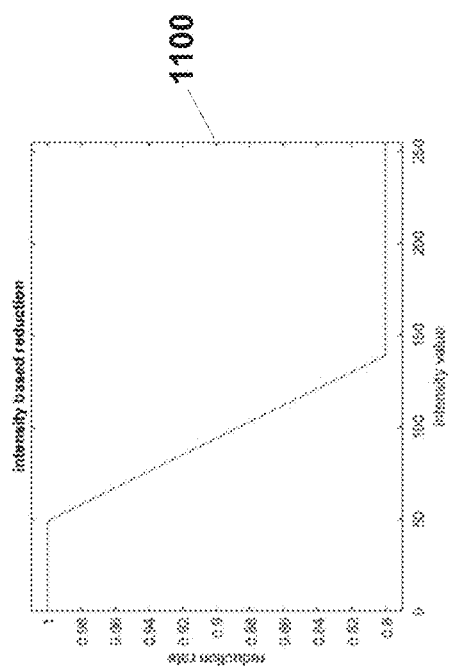
FIG. 10
FIG. 11

SELF-EMITTING DISPLAY (SED) BURN-IN PREVENTION BASED ON STATIONARY LUMINANCE REDUCTION

CROSS-REFERENCE TO RELATED APPLICATIONS

This application claims the priority benefit of U.S. Provisional Patent Application Ser. No. 63/232,869, filed Aug. 13, 2021, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to self-emitting display (SED) burn-in, and in particular, to stationary luminance reduction processing to slow SED burn-in.

BACKGROUND

SED types of displays have been recently used in many multimedia devices such as television (TV) and smart phones because it has shown better image contrast and lower power consumption than liquid crystal display (LCD) devices. The SED types of displays, however, have a major problem, referred to as burn-in, which refers to a non-uniform deterioration pixel region and looks like image ghosting. Generally, the burn-in is generated by the bright stationary pixels. Since the burn-in not only rapidly reduces the lifetime of SED panels but also causes image quality degradation, it has been a critical problem to be solved.

SUMMARY

One embodiment provides a computer-implemented method that includes providing a dynamic list structure that stores one or more detected object bounding boxes. Temporal analysis is applied that updates the dynamic list structure with object validation to reduce temporal artifacts. A two-dimensional (2D) buffer is utilized to store a luminance reduction ratio of a whole video frame. The luminance reduction ratio is applied to each pixel in the whole video frame based on the 2D buffer. One or more spatial smoothing filters are applied to the 2D buffer to reduce a likelihood of one or more spatial artifacts occurring in a luminance reduced region.

Another embodiment includes a non-transitory processor-readable medium that includes a program that when executed by a processor performs prevention of self-emitting display (SED) burn-in, including providing, by the processor, a dynamic list structure that stores one or more detected object bounding boxes. The processor further applies temporal analysis that updates the dynamic list structure with object validation to reduce temporal artifacts. The processor still further utilizes a 2D buffer to store a luminance reduction ratio of a whole video frame. The processor additionally applies the luminance reduction ratio to each pixel in the whole video frame based on the 2D buffer. The processor further applies one or more spatial smoothing filters to the 2D buffer to reduce a likelihood of one or more spatial artifacts occurring in a luminance reduced region.

Still another embodiment provides an apparatus that includes a memory storing instructions, and at least one processor executes the instructions including a process configured to providing a dynamic list structure that stores one or more detected object bounding boxes. Temporal analysis is applied that updates the dynamic list structure with object validation to reduce temporal artifacts. A two-dimensional (2D) buffer is utilized to store a luminance reduction ratio of a whole video frame. The luminance reduction ratio is applied to each pixel in the whole video frame based on the 2D buffer. One or more spatial smoothing filters are applied to the 2D buffer to reduce a likelihood of one or more spatial artifacts occurring in a luminance reduced region.

These and other features, aspects and advantages of the one or more embodiments will become understood with reference to the following description, appended claims and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which:

FIG. 2 illustrates an example of SED burn-in;

FIG. 10 illustrates an example global reduction pipeline diagram associated with the disclosed technology for luminance reduction, according to some embodiments;

FIG. 11 illustrates an example graph for a function used for pixel-wise global reduction, according to some embodiments;

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to SED burn-in, and in particular, to luminance reduction processing to slow SED burn-in. One embodiment provides a computer-implemented method that includes providing a dynamic list structure that stores one or more detected object bounding boxes. Temporal analysis is applied that updates the dynamic list structure with object validation to reduce temporal artifacts. A two-dimensional (2D) buffer is utilized to store a luminance reduction ratio of a whole video frame. The luminance reduction ratio is applied to each pixel in the whole video frame based on the 2D buffer. One or more spatial smoothing filters are applied to the 2D buffer to reduce a likelihood of one or more spatial artifacts occurring in a luminance reduced region.

Figure 1:
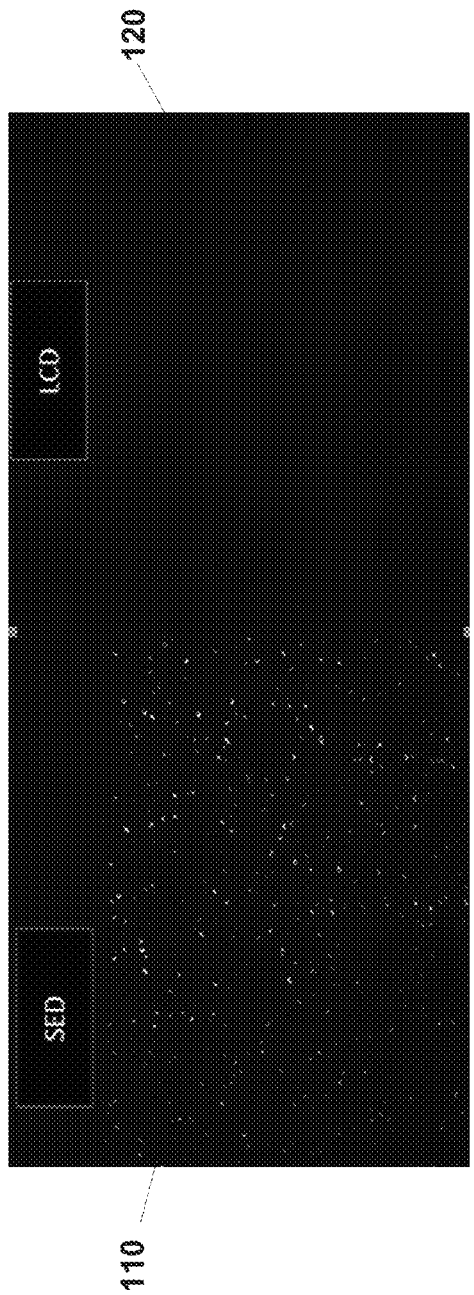
FIG. 1 illustrates an example showing the difference between a self-emitting display (SED) technology and liquid crystal display (LCD) technology.

FIG. 1 illustrates an example showing the difference between a SED technology and liquid crystal display (LCD) technology. Screens that use SED technology deliver the best image quality on TVs. SED technology gets more and more popular because it can show true black hence more contrast levels than LCD. For example, the SED technology display 110 (galaxy) shows the superiority of SED display technology over the LCD display 120 technology.

Figure 2:
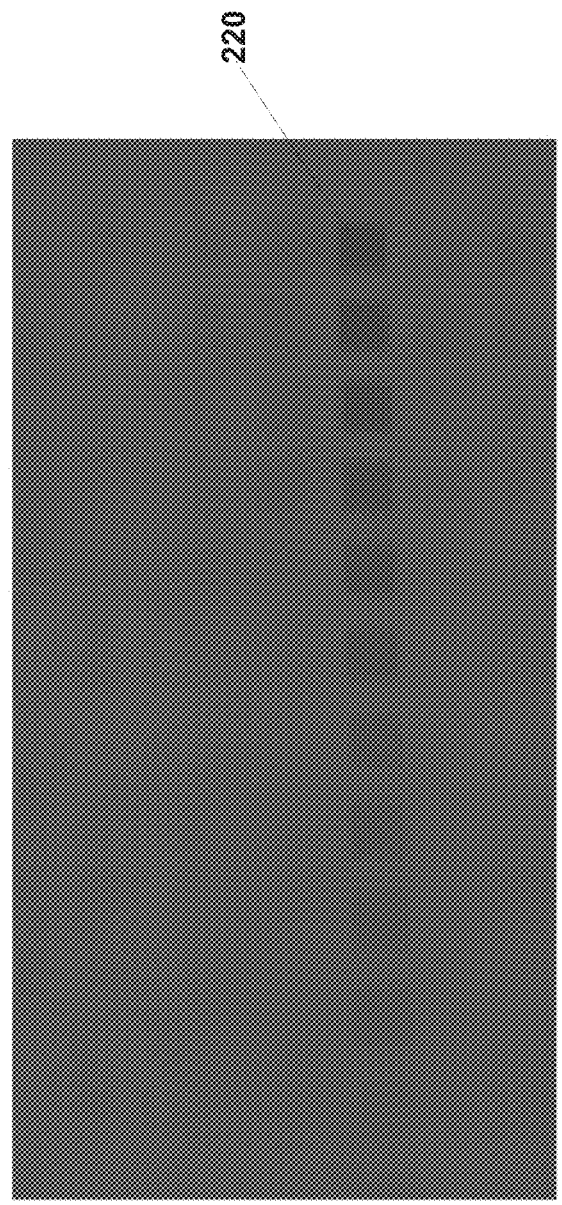

FIG. 2 illustrates an example of SED display 200 burn-in. SED screens suffer from a potential problem: burn-in. Burn-in refers to permanent image retention usually caused by a static image such as a channel logo/stationary region on the screen that remains for a longer period than dynamic images, and that remains as a ghostly background no matter what else appears on-screen. Some embodiments prevent burn-in by reducing the luminance of a channel logo/stationary region on the screen to extend the life of SED TVs without compromising visual qualities. As shown, the example burn-in location 220 on the SED display 200 appears as remnants or ghost images. Since the burn-in not only rapidly reduces the lifetime of SED panels but also causes image quality degradation, it can be a critical problem that needs to be solved.

Figure 3:
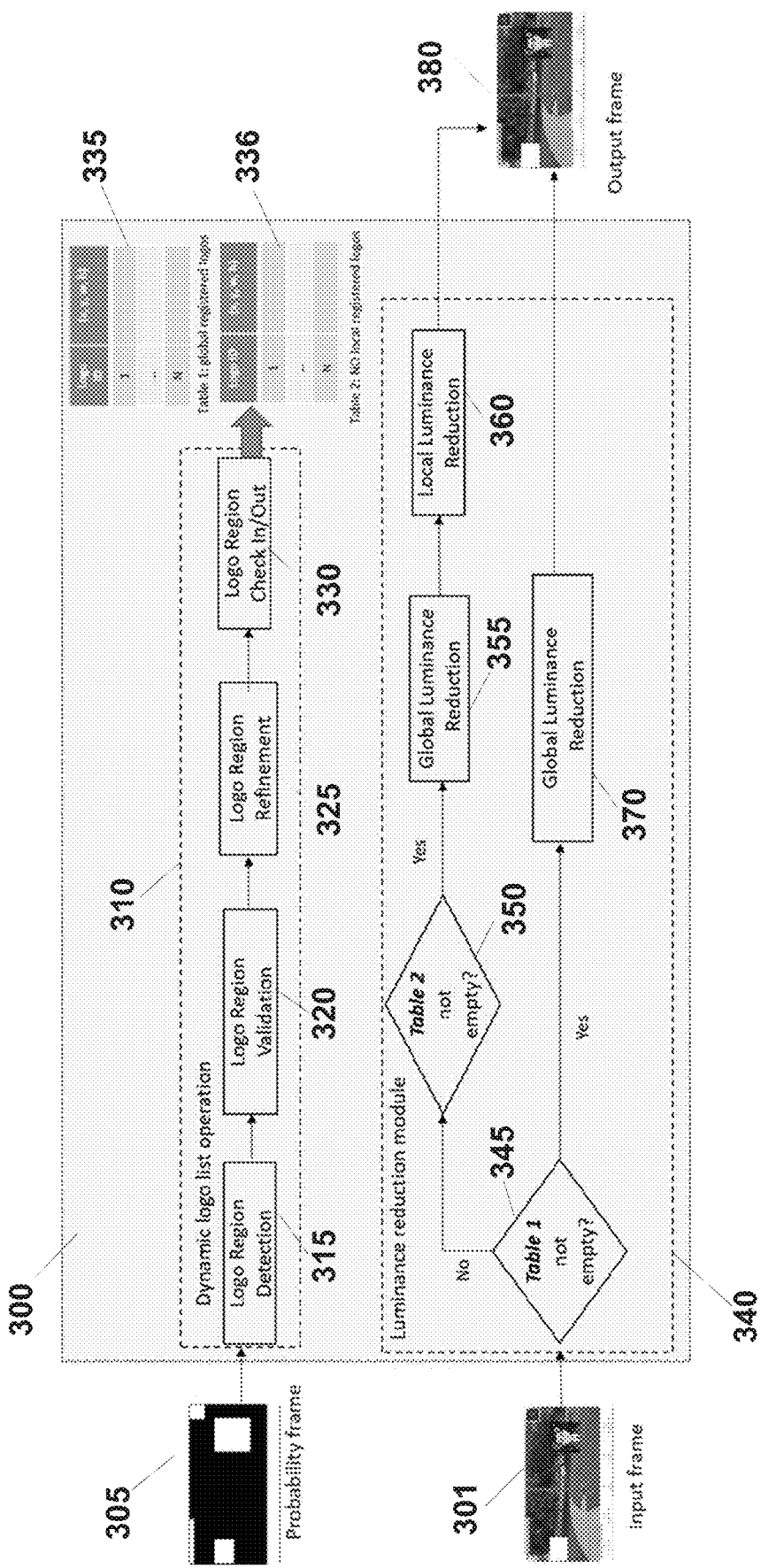
FIG. 3 illustrates an example pipeline diagram associated with the disclosed technology for luminance reduction, according to some embodiments.

FIG. 3 illustrates an example pipeline 300 diagram associated with the disclosed technology for luminance reduction, according to some embodiments. Since the burn-in not only rapidly reduces the lifetime of SED panels but also causes image quality degradation, it has been a critical problem to be solved. Some embodiments provide a dynamic list structure to store the detected bounding boxes of the stationary regions, which indicate if a stationary region needs to apply luminance reduction (the bounding box is in the dynamic list for a long enough time) or the corresponding region needs luminance recovery (the corresponding bounding box has been removed from the dynamic list). One or more embodiments apply temporal analysis to update the dynamic list structure with object validation/refinement/check-in(enrollment)/check-out(resignation) operations, which reduces the temporal artifacts.

Some embodiments utilize a very small two-dimensional (2D) buffer (e.g. 15×15) to store a luminance reduction ratio of a whole video frame and apply luminance reduction ratio processing to each of the pixels in the whole video frame based on the 2D buffer, which also reduces the hardware cost. Spatial smoothing filters (e.g., Gaussian filter, average filter, etc.) are applied to the 2D buffer, which stores the luminance reduction information, and prevents spatial artifacts from occurring for the luminance reduced region.

In one or more embodiments, pipeline 300 inputs an input (video) frame 301 and a probability frame 305. The probability frame is based on probability of an occurrence of a (stationary) logo within a map (e.g., 30×30). Processing block 300 includes a dynamic logo list operation block 310 and a luminance reduction block (or module) 340. In some embodiments, the dynamic logo list operation block 310 includes logo region detection processing 315, logo region validation processing 320, logo region refinement processing 325 and logo region check-in/check-out processing 330. The output from block 330 are stored in table 1 335 that includes global registered logos, and table 2 336 that includes no local registered logos. In one or more embodiments, the luminance reduction block 340 provides determining if table 1 335 is empty or not in block 345. If the table 1 335 is determined to be empty, processing proceeds to determine whether a table 2 336 is empty or not in block 350. Otherwise, processing proceeds to perform global luminance reduction in block 370. If table 2 336 is determined not to be empty, processing proceeds to perform global luminance reduction in block 355. Processing then performs local luminance reduction in block 360. The output from blocks 360 and 370 are used to generate the output frame 380. The details of the dynamic logo list operation block 310 and the luminance reduction block 340 are described below.

Figure 4:
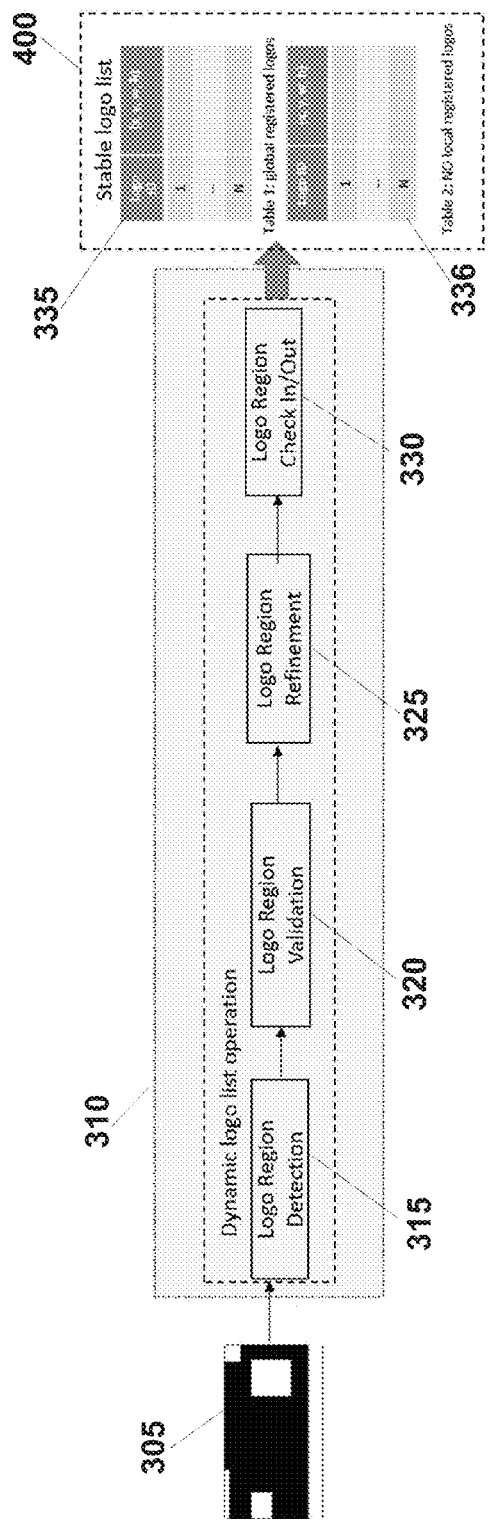
FIG. 4 illustrates an example dynamic logo list operation (pipeline) diagram associated with the disclosed technology for luminance reduction, according to some embodiments.

FIG. 4 illustrates an example dynamic logo list operation (pipeline) block 310 diagram associated with the disclosed technology for luminance reduction, according to some embodiments. The dynamic logo list operation block 310 provides a hardware-friendly processing algorithm that tracks logos and other static regions over an entire video frame. This processing algorithm implements the object-based process to extract a logo or other static region. The size and the position from the center (of a video frame) of the logo or static region are used to calculate the maximum luminance reduction limit. The object-based processing provides a powerful tool to control the maximum reduction limit based on the logo or static region shape and its position from the center of a video frame. The processing implements an efficient list-based structure (stable logo list 400) to track the logo or static region until it disappears. The block-based processing also tracks the luminance reduction along the temporal direction based on the appearing or disappearing of a logo or static region. This provides a smoother luminance reduction/recovery to the maximum-reduction-limit/back-to-original value of the appearing/disappearing while maintaining the visual quality.

Figure 5:
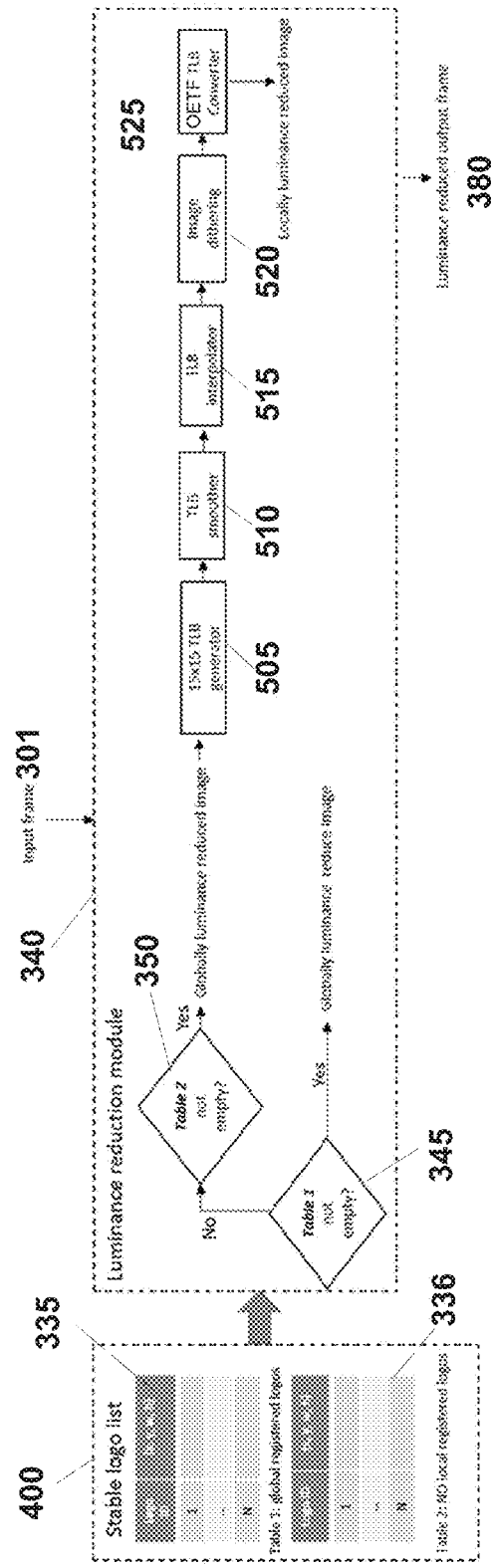
FIG. 5 illustrates an example luminance reduction pipeline diagram associated with the disclosed technology for luminance reduction, according to some embodiments.

FIG. 5 illustrates an example luminance reduction (pipeline) block 340 diagram associated with the disclosed technology for luminance reduction, according to some embodiments. Processing of the luminance reduction block 340 shows how to store a luminance reduction rate inside a 15×15 2D buffer (Target limit buffer (TLB)) during luminance reduction processing. Based on the stable logo list 400, a luminance of an input image is reduced either globally or both globally and locally. If table 1 335 is determined to be not empty in block 345, processing only applies global luminance reduction on the input image. In block 350, if table 2 336 is determined to be not empty, processing applies both global and local luminance reduction processing. If it is determined in block 350 that table 2 is not empty, the TLB buffer is first generated by the TLB generator 505 to dynamically store the reduction ratio of an appearing/disappearing/staying logo/static region, which in fact, assists to prevent a temporal artifact. The TLB buffer is passed to the TLB smoother 510 (e.g., a gaussian filter) for smoothing to prevent spatial artifacts. The processing applies to any size of an input image (e.g., 480p, 1080p, 4K), and the image TLB interpolator 515 resizes the TLB buffer dynamically to the size of the input image. Image dithering 520 is applied to the resized TLB for smoother luminance reduction within the spatial and temporal domain, making the change in luminance reduction on the future frame perceptibly indistinguishable. The dithered TLB is applied to the input image and an optical-electro transfer function (OETF) TLB converter 525 generates a luminance reduced output frame 380 image. Note that input image requires to have an electro-optical transfer function (EOTF) operation applied (described below). In order to minimize hardware cost due to conversion between OETF to EOTF and bit depth expansion, an OETF based lookup table (LUT) is carefully prepared that corresponds to the luminance reduction ratio in terms of 10 bits representation.

In some embodiments, the 2D 15×15 TLB buffer implemented in the processing provides a smooth luminance reduction/recovery/maintenance without a temporal artifact. Additionally, the spatial smoothing on the 15×15 2D TLB helps to prevent a spatial artifact. Generally, the CodeDomainImage is converted to a LinearDomainImage to apply luminance reduction using the TLB. Once the TLB is applied, the LinearDomainImage is converted to the CodeDomainImage. To apply luminance reduction, the code domain equation is converted to a linear domain image using equation (1):

$$\text{LinearDomainImage} = \text{TargetLimitBuffer} \times \text{CodeDomainImage}^{2.2} \quad (1)$$

In one or more embodiments, once luminance reduction is applied the processing proceeds back to the code domain using equation (2):

$$\text{CodeDomainImage} = (\text{LinearDomainImage})^{1/2.2} \quad (2)$$

In some embodiments, the two steps (equation (1) and equation (2)) are replaced/removed to a single step with the use of the following. First, equation (3) represents the relation between CodeDomainImage, and LinearDomainImage.

$$\text{CodeDomainImage} = (\text{TargetLimitBuffer} \times \text{CodeDomainImage}^{2.2})^{1/2.2} \quad (3)$$

Replacing LinearDomainImage from equation (1) to (3):

$$\text{CodeDomainImage} = (\text{TargetLimitBuffer})^{1/2.2} \times \text{CodeDomainImage} \quad (4)$$

Figure 14:
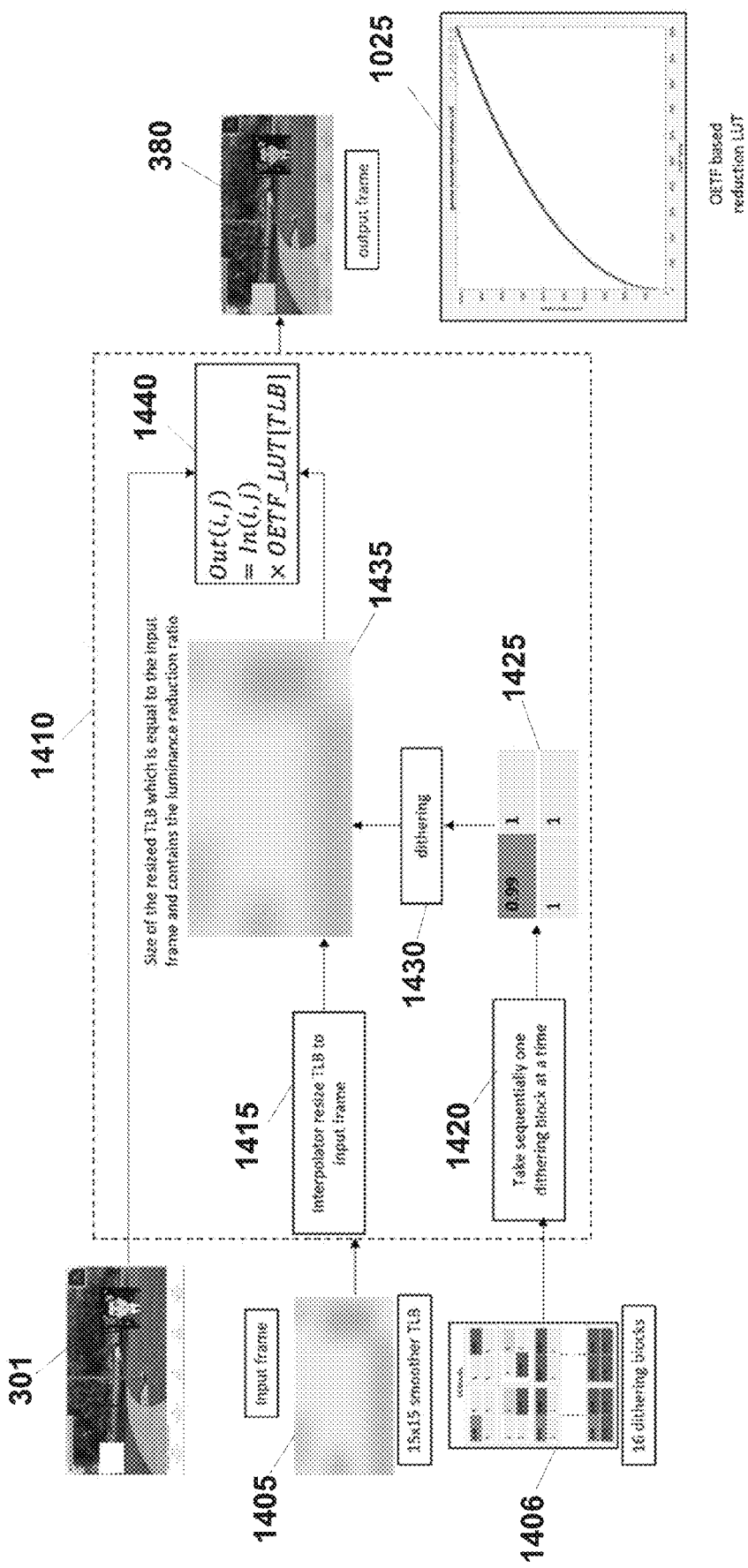
FIG. 14 illustrates a third processing portion diagram of a local reduction pipeline associated with the disclosed technology for luminance reduction, according to some embodiments.
Figure 15:
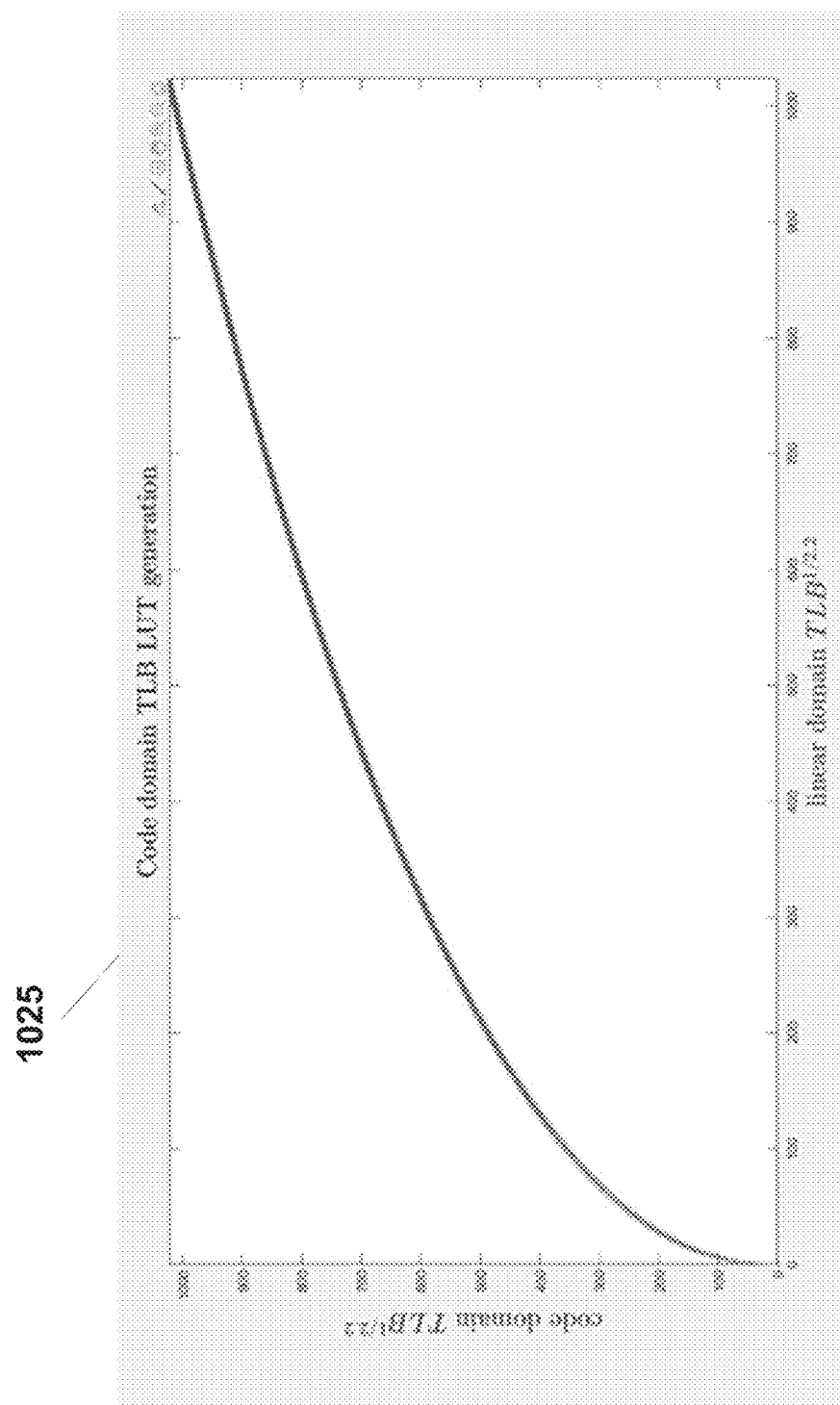
FIG. 15 illustrates a graph used for determining an optical-electro transfer function (OETF) lookup table (LUT), according to some embodiments.

Based on the equation (4) a LUT is generated for the TLB in the code domain as shown in FIGS. 10, 14 and 15 as graph 1025. Equation (4) is used only to apply luminance reduction by converting the TLB to the code domain region.

Figure 6:
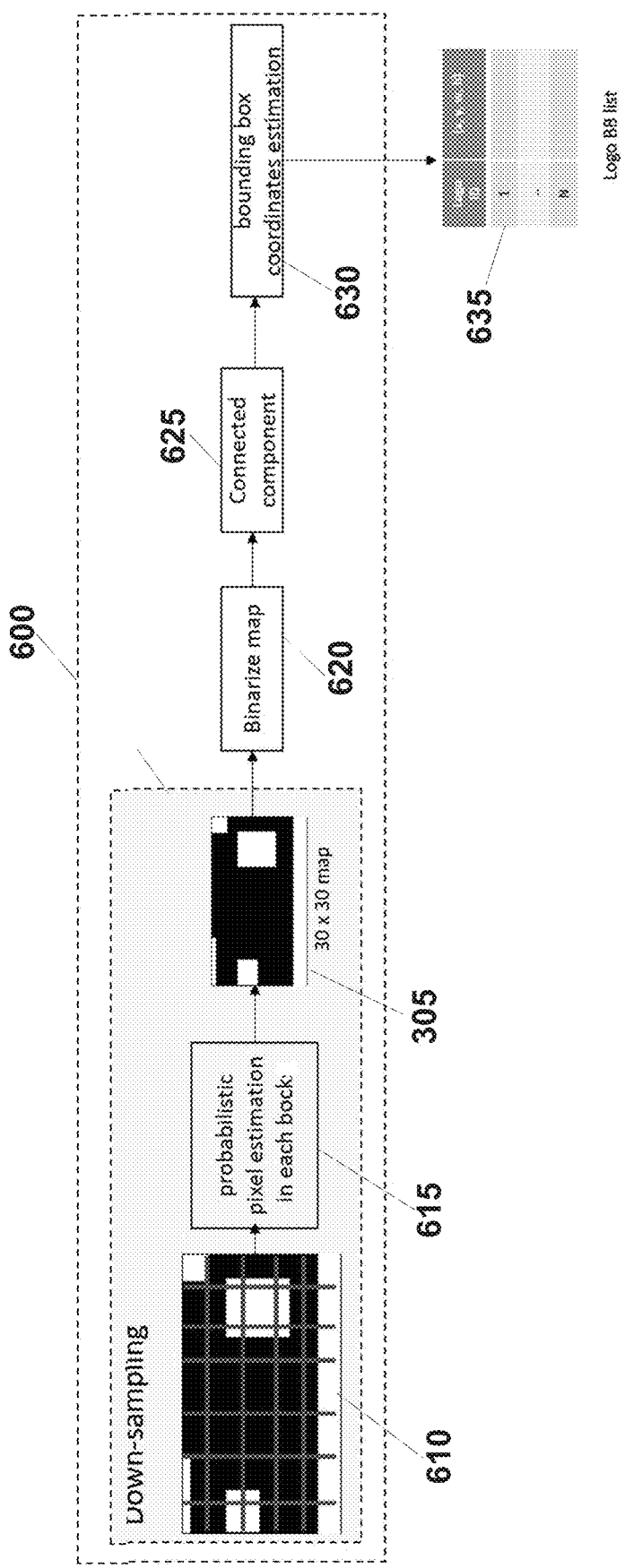
FIG. 6 illustrates an example logo detection pipeline diagram associated with the disclosed technology for luminance reduction, according to some embodiments.

FIG. 6 illustrates an example logo detection pipeline 600 diagram associated with the disclosed technology for luminance reduction, according to some embodiments. In FIG. 6, the probability map is divided into 30×30 blocks based on the probability of that logo within each blocks using the following $P(X, Y) = p(x, y)/N$, where $p(x, y)$ is pixel intensity of the map having a size of 540×960 before the downsampling 610, N is the total number of non-zero pixels within each block, and P(X, Y) is the probabilistic pixel estimation in each block 615 of an occurrence of the logo within the 30×30 map 305. Based on the 30×30 map 305, the binary image map is generated in the binarize map block 620 and then a connected component (CC) process 625 is implemented. The CC process (or algorithm) is useful to extract the bounding box co-ordinate of a detected logo. Finally the logo bounding box (BB) list 635 is generated using the bounding box co-ordinates estimation process 630.

Figure 7:
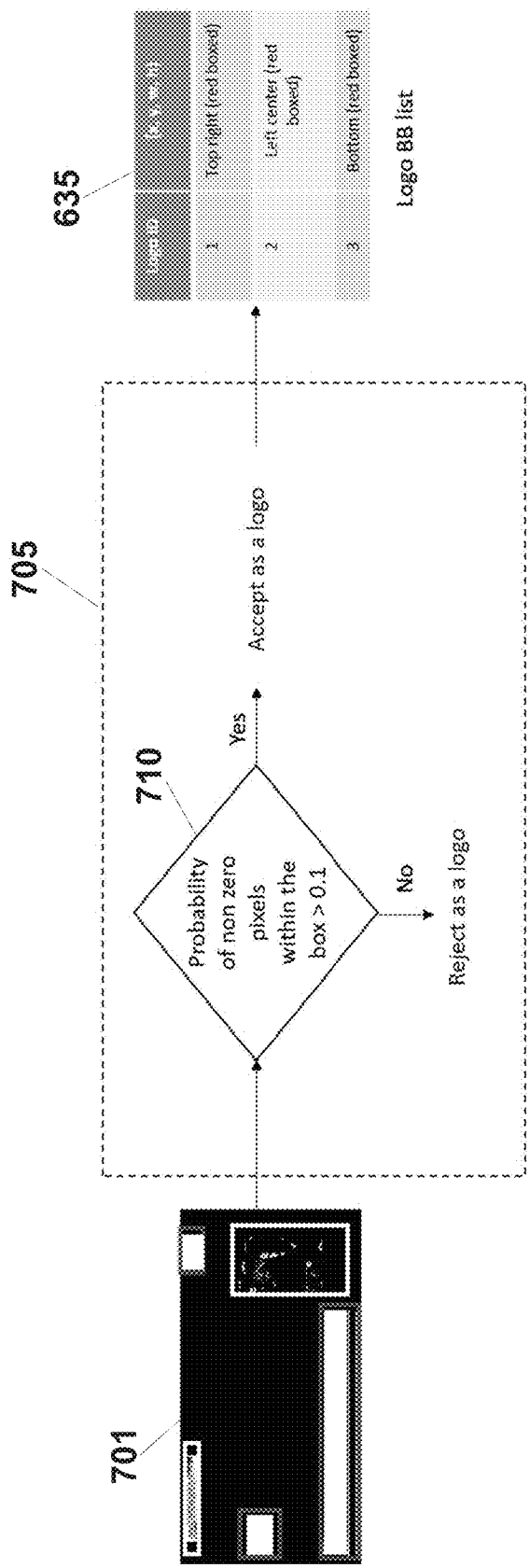
FIG. 7 illustrates an example logo region validation processing diagram associated with the disclosed technology for luminance reduction, according to some embodiments.

FIG. 7 illustrates an example logo region validation processing diagram associated with the disclosed technology for luminance reduction, according to some embodiments. The stationary detection processing or algorithm cannot always detect a logo correctly; sometimes, a non-logo/static region is incorrectly detected as a logo. If it is assumed that a falsely detected logo as an actual logo, the luminance reduction corresponding to the falsely detected logo produces visually unpleasant results. The logo validation block 705 (or module) validates whether the detected logo is a real logo or a false logo, and discards an incorrectly detected logo if the following case is true. The logo validation block 705 uses the probabilistic-based approach to accept if the logo is real and reject if the logo is false. Probability frame 701 is input to the logo validation block 705 and it is determined in block 710 whether the probability of non-zero pixels within each of the boxes are greater than 0.1. If block 710 determines that the probability of non-zero pixels within a box is not greater than 0.1, those pixels in the box are rejected as a logo. Otherwise, those pixels in the box are accepted as a logo and entered into logo BB list 635.

Figure 8:
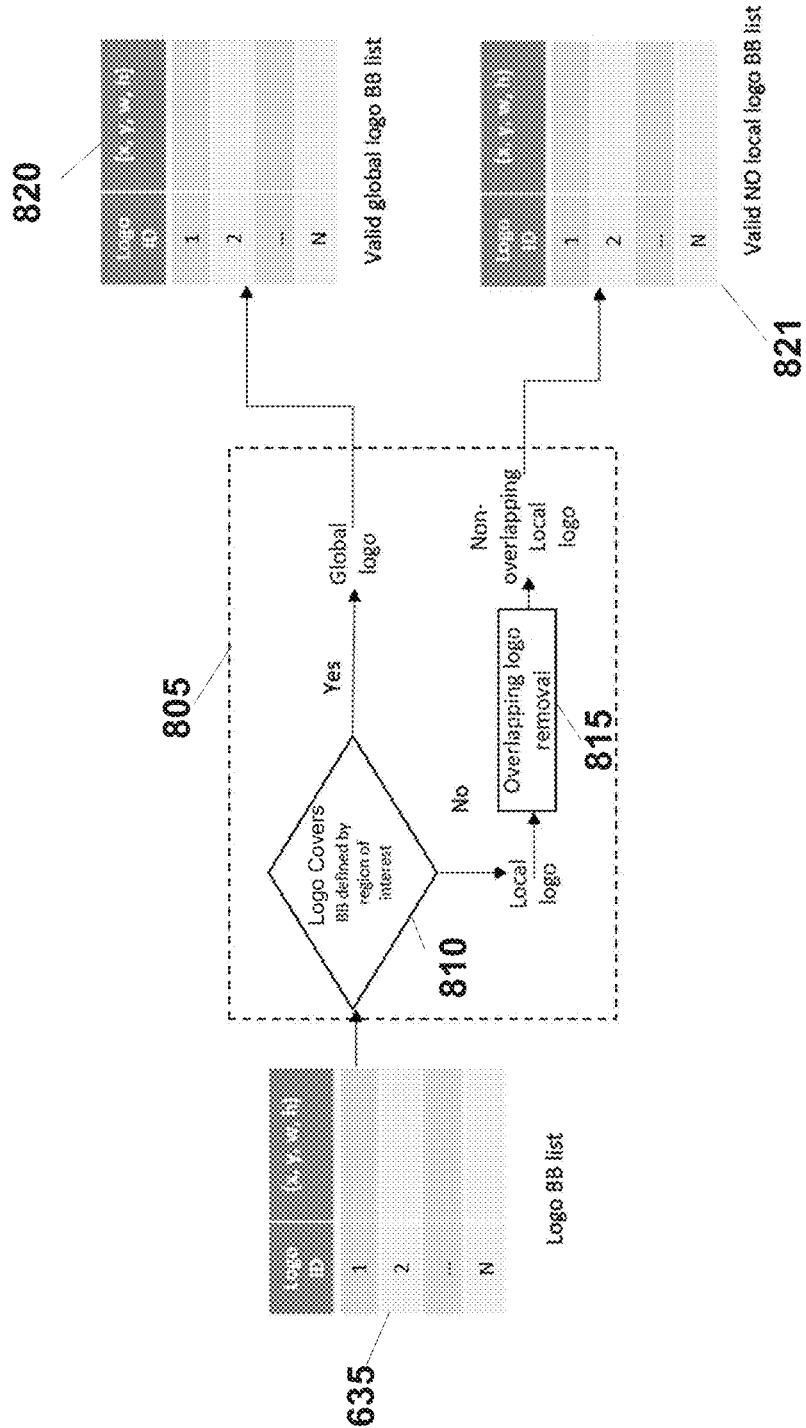
FIG. 8 illustrates an example logo region refinement processing diagram associated with the disclosed technology for luminance reduction, according to some embodiments.

FIG. 8 illustrates an example logo region refinement processing diagram associated with the disclosed technology for luminance reduction, according to some embodiments. In one or more embodiments, a big-central logo is registered as a global logo and remaining logos are each registered as a local logo to minimize a possible visual artifact during luminance reduction on a corresponding logo. This is due to BB based luminance reduction applied on the big-central logo produces a visually unpleasant output. In such cases, for a logo covering an entire frame, some embodiments only perform global reduction. For a local logo/static region (a logo that does not cover the central region of interest BB), some embodiments generate a non-overlapping BB list at first. This is because sometimes processing may detect two logos very close such that their BB coordinates are overlapped by more than 10%. In such a scenario, the maximum luminance reduction limit is surpassed when the individual luminance reduction is applied within each BBs defined by the first and the second logo/static region. In that case, if they are overlapped (for example, more than 80%), then two times reduction rate on the overlapped region creates temporal and spatial visual artifacts. This effect becomes more severe if more than two BBs are overlapped. In one or more embodiments, overlapping logo removal is performed inside the logo region refinement block 805 (or module) to overcome such cases. In some embodiments, the logo BB list 635 is input to the logo refinement block 805 where block 810 determines whether the logo covers BB defined by a region of interest. If it is determined in block 810 that the logo covers BB defined by the region, then the logo is determined as a global logo and entered into a valid global logo BB list 820. Otherwise, the logo is determined to be a local logo and block 815 performs overlapping logo removal. The non-0overlapping local logo is then entered into the valid no local logo BB list 821.

Figure 9:
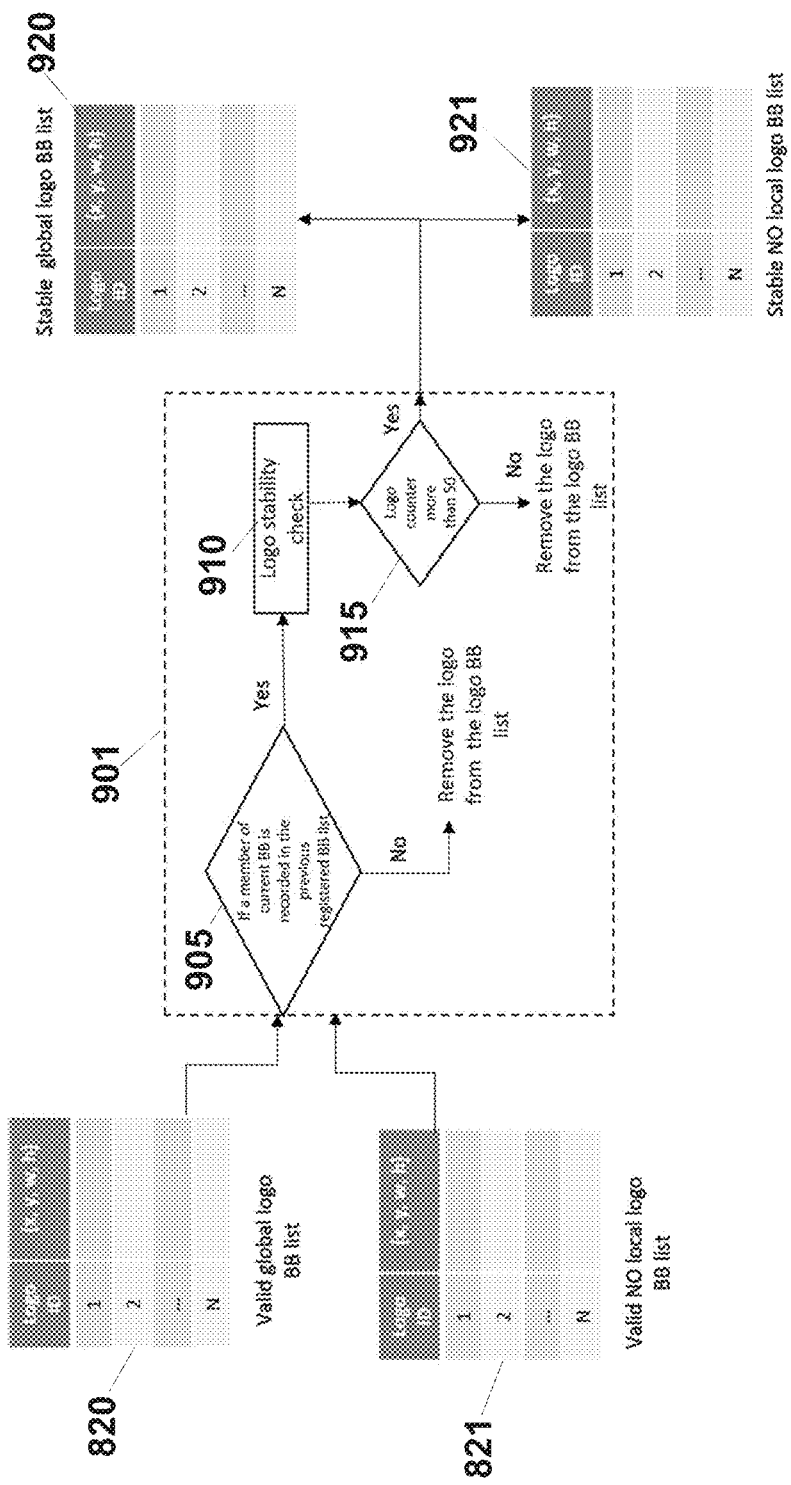
FIG. 9 illustrates an example logo check-in-check-out processing diagram associated with the disclosed technology for luminance reduction, according to some embodiments.

FIG. 9 illustrates an example logo check-in-check-out processing diagram associated with the disclosed technology for luminance reduction, according to some embodiments. In one or more embodiments, the logo check-in-check-out block (or module) 901 checks the stability of the logo to remove a false logo/static region. An incorrect logo checked out is vital to reducing visual artifacts during a luminance reduction. In some embodiments, an efficient dynamic BB list comparison is performed for a logo stability check (logo stability check block (or module) 910). The location and range of a logo/static region coordinates are used to check whether the logo in the current frame is the same as the previous frame. Once a logo/static region becomes stable (e.g., the same logo should appear at least fifty (50) times to categorize as an actual/stable logo), processing registers (checked-in) the detected logo/stationary region as an actual logo and luminance reduction is started on the corresponding logo to minimize an OLED burn-in. Finally, in some embodiments a disappearing logo/static region must be checked-out from the dynamic BB list. Otherwise, continuous luminance reduction on the corresponding logo region produces a visual artifact in temporal (flickering) and spatial domain (dissimilarity).

In one or more embodiments, the input to the logo check-in-check-out block 901 are the valid global logo BB list 820 and the valid no local logo BB list 821. In block 905, it is determined whether a member of the current BB is recorded in the previous registered BB list or not. If the logo check-in-check-out block 901 determines that the member of the current BB is recorded in the previous registered BB list, then processing proceeds to the logo stability check block 910. Otherwise, processing proceeds to remove the logo from the logo BB list. After the logo stability check block 910 processing completes, processing continues to block 915 where it is determined whether a logo counter is greater than fifty (50). If it is determined that the logo counter is not greater than 50, the logo is removed from the logo BB list. Otherwise, the logo is added (depending on log type) to either the stable global logo BB list 920 or the stable no local logo BB list 921.

FIG. 10 illustrates an example global reduction pipeline diagram associated with the disclosed technology for luminance reduction, according to some embodiments. The global reduction processing becomes active for a global reduction only if table 1 335 (global registered logo) or table 2 336 (local register logo) is true for including one or more logos. A 1D global target limit buffer (GTLB) 1005 having a 1024 byte size is prepared to keep track of the (global) luminance (reduction) ratio. Which, in fact, helps for a smoother global luminance reduction without any temporal artifacts. Generally, the EOTF operation is performed on the input image, the luminance reduction ratio is applied, and finally, the OETF operation is performed, which is expensive in terms of integer version computation. This is because EOTF processing requires applying a float version of the power operation (2.2) to convert the gamma domain image to the linear domain image, which involves some form of a LUT with a bit depth of more than ten and requires a binary search operation. Further, it demands more bit depths for faithfully generating a luminance-reduced image. The OETF based LUT is generated corresponding to the luminance reduction ratio in terms of 10 bits representation, which is very efficient and uses just 10 bits of information during luminance reduction processing. Thus, less of a bit depth structure (ten bits) is used and avoids computational work required for the EOTF and OETF operation to perform such tasks based on the carefully prepared reduction rate LUT.

In some embodiments, the inputs for processing block 1000 includes the input frame 301, table 1 335 or table 2 336 and GTLB 1005. Block 1015 performs out(i,j)=in(i,j)×OETF_GTLB using the input frame 301. The OETF based reduction LUT 1020 is based on graph 1025 and is performed using the GTLB 1005. The output frame 380 is a luminance reduced frame.

FIG. 11 illustrates an example graph 1100 for a function used for pixel-wise global reduction, according to some embodiments. Graph 1100 illustrates the maximum possible reduction limit corresponding to the pixel intensity value.

Figure 12:
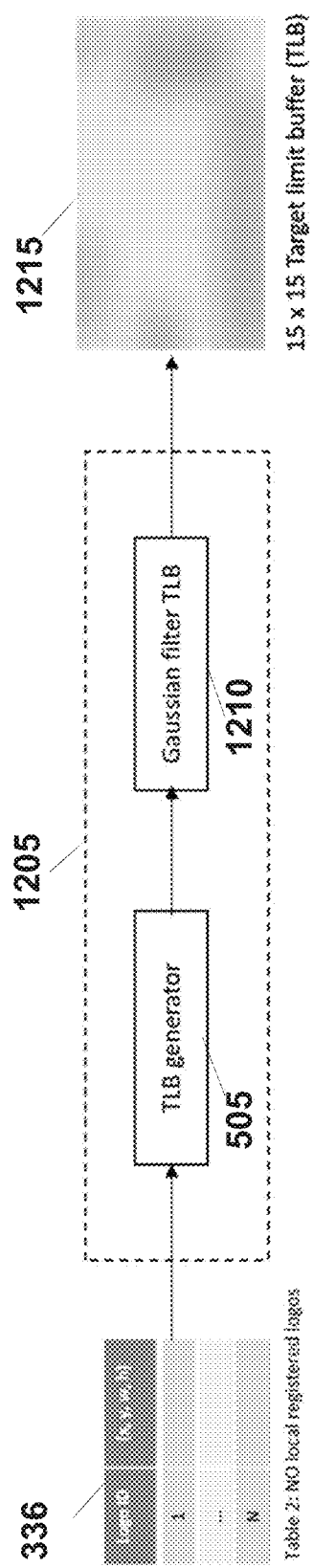
FIG. 12 illustrates a first processing portion diagram of a local reduction pipeline associated with the disclosed technology for luminance reduction, according to some embodiments.

FIG. 12 illustrates a first processing portion 1205 diagram of a local reduction pipeline associated with the disclosed technology for luminance reduction, according to some embodiments. Once table 2 336 (local registered logo) is not empty and the stable logo check condition is maintained, the TLB generator 505 uses the list-based information to generate a 2D 15×15 TLB 1215. The TLB 1215 buffer helps to keep track of an appearing/disappearing/staying logo along the temporal direction. The TLB 1215 is based on object-based logo detection. Thus, it helps to maintain/recover/increase the luminance on each logo; for example, where one logo at the top left corner is remaining longer, the logo on a top right corner is disappearing, and a logo on the bottom left corner is appearing. In fact, the 2D TLB 1215 buffer is useful for maintaining the smoother change in the luminance along the temporal direction to prevent a temporal artifact. The Gaussian filter TLB 1210 performed on the TLB generated from the TLB generator 505 is helpful to smooth the TLB spatially to make a smoother transition of the pixel between logo and non-logo region to prevent a spatial artifact.

Figure 13:
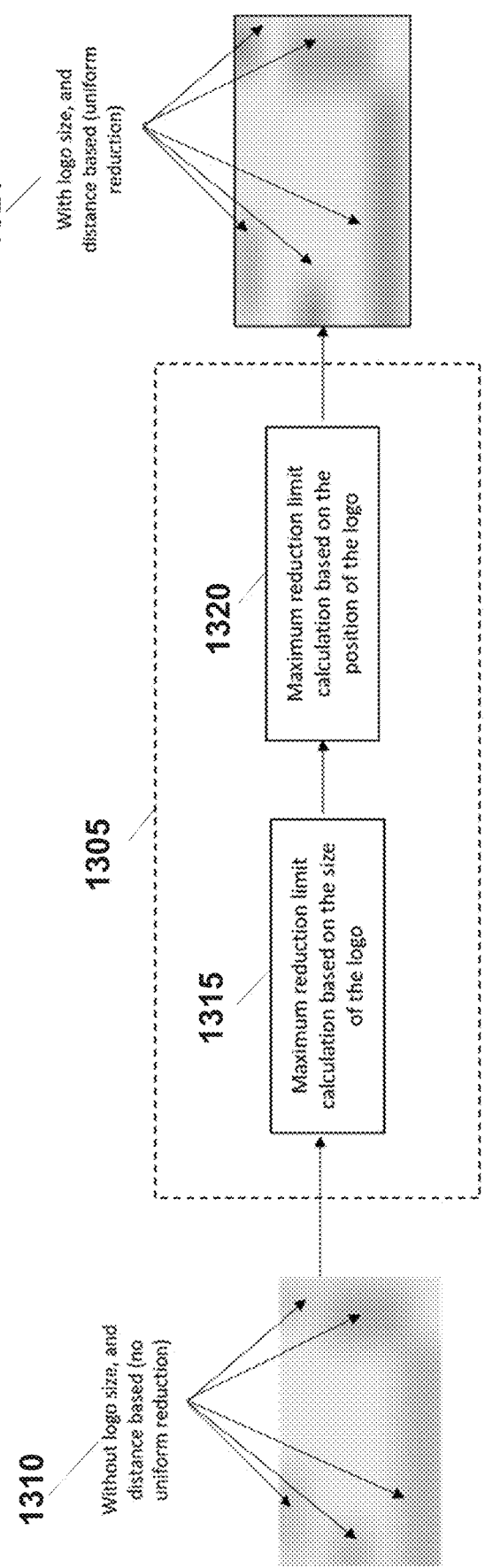
FIG. 13 illustrates a second processing portion diagram of a local reduction pipeline associated with the disclosed technology for luminance reduction, according to some embodiments.

FIG. 13 illustrates a second processing portion 1305 diagram of a local reduction pipeline associated with the disclosed technology for luminance reduction, according to some embodiments. The use of the gaussian filter TLB 1210 (FIG. 12) makes a variation in the luminance reduction ratio due to the logo size. The Gaussian filter TLB 1210 on an isolated smaller logo produces a smaller luminance reduction ratio than its assumed luminance reduction ratio. This is because the Gaussian filter TLB 1210 of size 15×15 on the logo region strongly depends on its neighboring area. Hence smaller logo region after the Gaussian filter TLB 1210 significantly loses the information of its actual luminance reduction ratio because the 15×15 filter may cover more non-logo regions than the logo region. There is, however, no such loss of information for the bigger size logo compared to its assumed luminance reduction ratio. Thus, in some embodiments there is a need to provide a process or algorithm that adaptively sets the maximum luminance reduction limit based on the logo size. In one or more embodiments, processing requires to set a higher maximum luminance limit for a smaller logo and a lower maximum reduction limit for a larger sized logo such that the same amount of luminance reduction effect can be felt irrespective of the logo size after the application of the 15×15 gaussian filter TLB 1210. Additionally, the probability of the logo occurrence is higher on the corners. Hence, one or more embodiments provide a process or algorithm capable of reducing luminance less at the center and more at the corner to minimize/protect a burn-in on a SED panel. In order to adaptively set the maximum luminance reduction ratio based on the logo position, some embodiments provide a process or algorithm that quickly locates the logo's position and sets the maximum luminance reduction limit based on its location from the center of the frame. The input to the second processing portion 1305 is a TLB without logo size, and distance based (no uniform reduction) 1310. Processing for the second processing portion 1305 includes block 1315 where a maximum reduction limit calculation based on the size of the logo is performed. In block 1320, processing for block 1320 includes a maximum reduction limit calculation based on the position of the logo. The output is TLB 1325 with a logo size and distance based (uniform reduction).

FIG. 14 illustrates a third processing portion 1410 diagram of a local reduction pipeline associated with the disclosed technology for luminance reduction, according to some embodiments. The inputs to the third processing portion 1410 include the input (video) frame 301 (original image), a 15×15 smoother TLB 1405 and 16 dithering blocks 1406. At first, the 15×15 smoother TLB 1405 is interpolated by block 1415 to the size of the original image 301 for a resized TLB 1435, and then passed to block 1440 for the OETF based reduction LUT similar to block 1015 of block 1000 (FIG. 10). The ten bits integer version OETF based luminance reduction ratio LUT in block 1440 is carefully prepared to make the computational work faster by removing an additional work between EOTF to OETF, and vice versa (where the OETF based reduction LUT is based on graph 1025). In block 1420 the processing takes sequentially one dithering block at a time from the 16 dithering blocks 1406 to form reduced blocks in block 1425 and performs dithering in block 1430 to smoothly reduce the luminance around the logo without any perceptual change. The output of the third processing block 1410 is the output frame 380 with reduced luminance.

FIG. 15 illustrates a graph 1025 used for determining the OETF LUT, according to some embodiments. Graph 1025 is used to generate LUT for code domain luminance reduction ratio (shown in the y-axis in graph 1025) from the linear domain luminance reduction ratio (shown in the x-axis in graph 1025). In some embodiments, graph 1025 provides a novel way to apply a code domain luminance reduction ratio LUT directly to minimize an additional two-step computation to a single computation, which makes processing computationally more efficient and faster.

Figure 16:
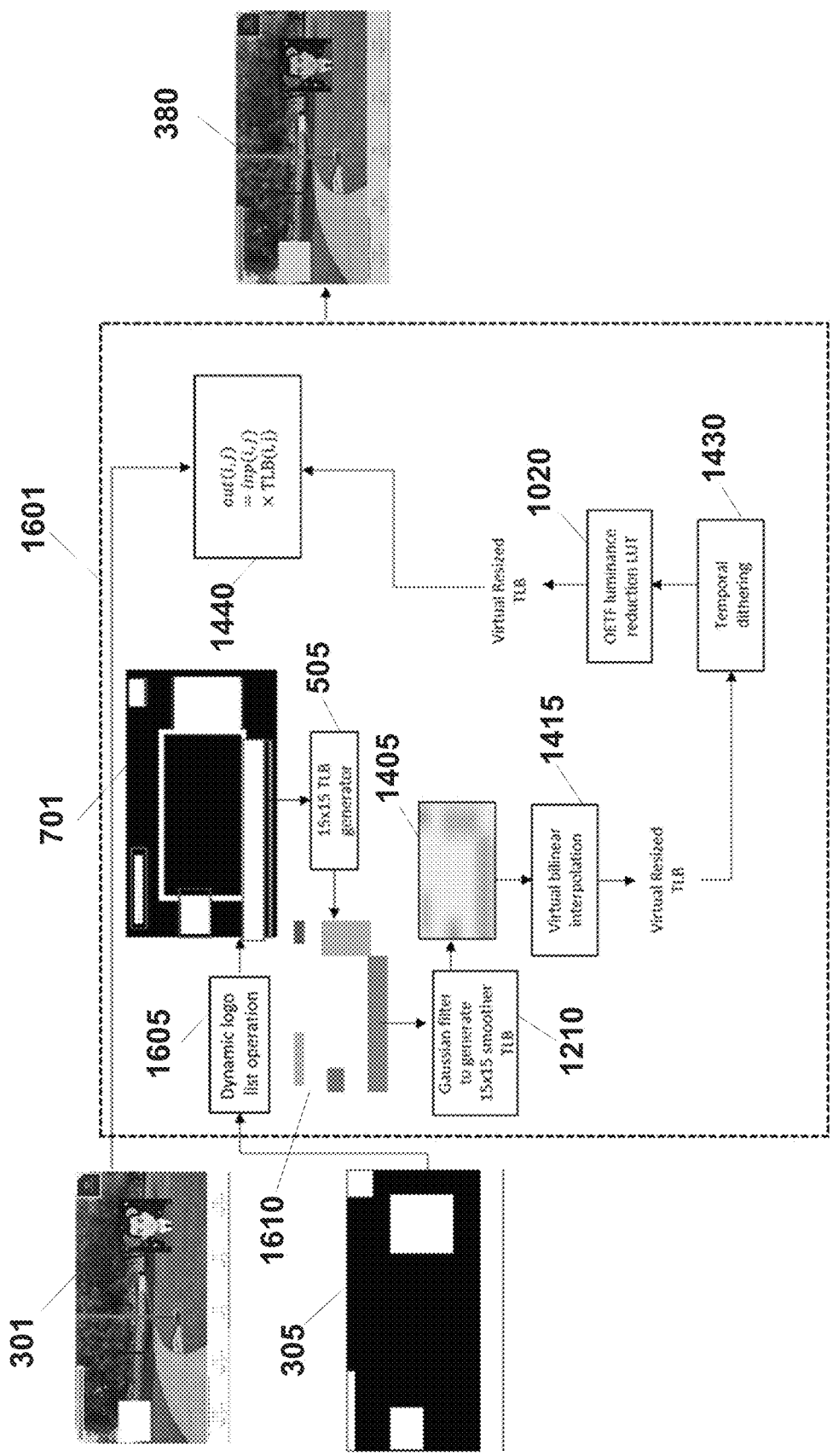
FIG. 16 illustrates an example of luminance reduced image generation, according to some embodiments.

FIG. 16 illustrates an example of luminance reduced image generation, according to some embodiments. The input to block 1601 are input (video) frame 301 and probability frame 305. The processing first extracts the four co-ordinates of logo/static position in a list at block 1605 (dynamic logo list operation) for the probability frame 701, and based on the list, a 15×15 TLB 1610 is generated in block 505. Block 1210 performs a gaussian filter to generate a 15×15 smoother TLB 1405. The 15×15 smoother TLB 1405 is bilinearly interpolated in block 1415 (virtual bilinear interpolation) to the image size virtually to generate luminance reduced image. Block 1430 performs temporal dithering, and the result is processed in OETF based reduction LUT 1020 to produce a virtual resized TLB that is input to block 1440 for the OETF based reduction LUT. The output frame 380 from block 1601 is a luminance reduced frame.

Figure 17A:
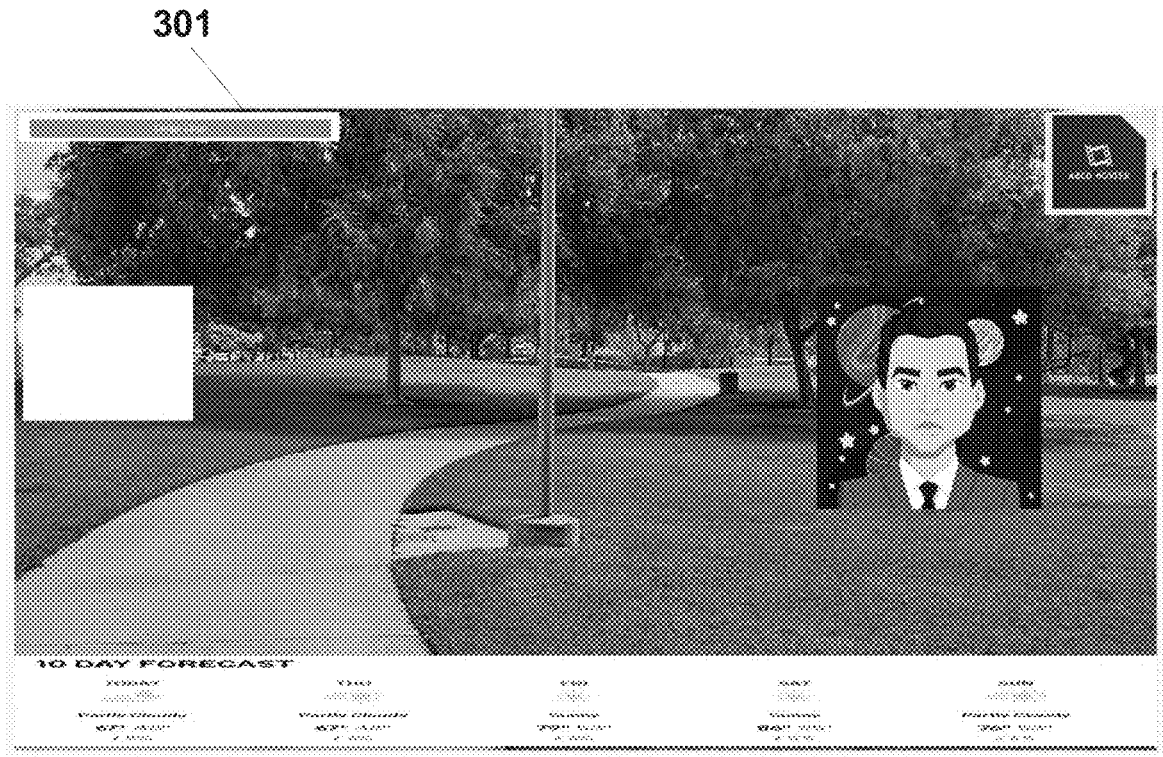
FIG. 17A illustrates an example of an original displayed input frame.
Figure 17B:
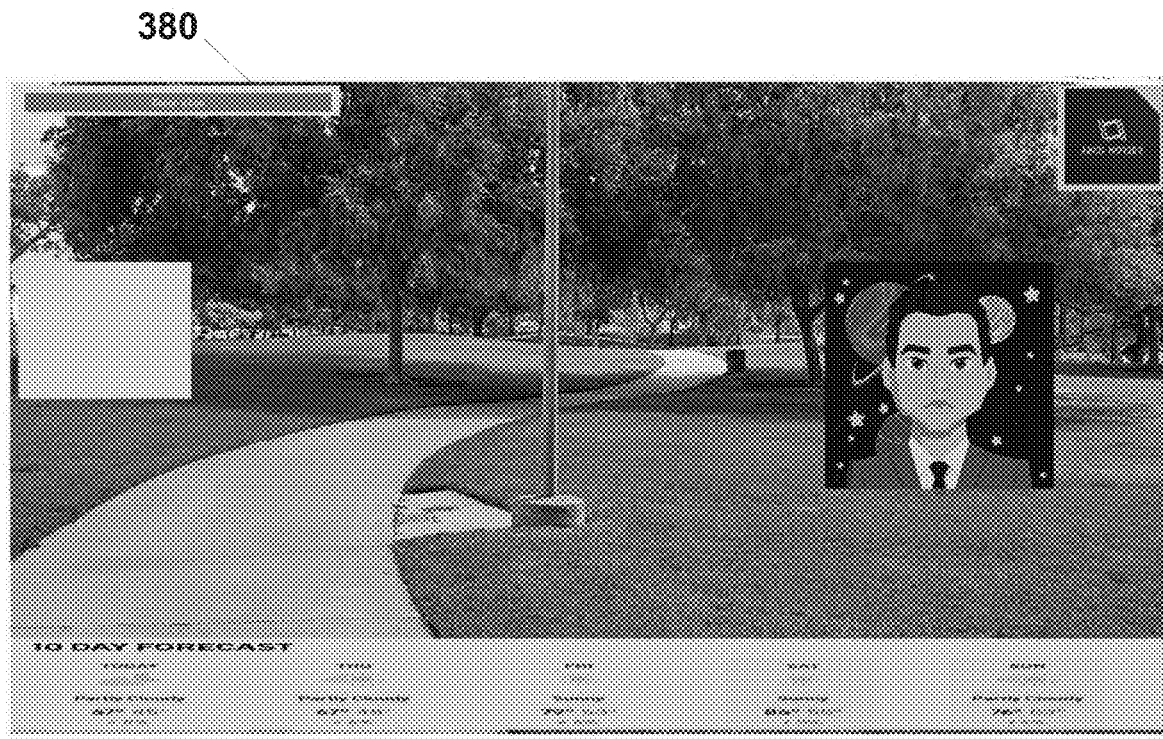
FIG. 17B illustrates an example of a luminance reduced output frame, according to some embodiments.

FIG. 17A illustrates an example of an original displayed input frame 301. FIG. 17B illustrates an example of a luminance reduced output frame 380, according to some embodiments. In some embodiments, the luminance reduction processing is useful to extend the life of the SED display. Input frame 301 can lead to a burn-in effect that creates ghosting artifacts, which is enough to distort the visual quality of the image. Output frame 380 shows reduced luminance for logos and stationary elements to reduce/delay the onset of SED display burn-in.

Figure 18:
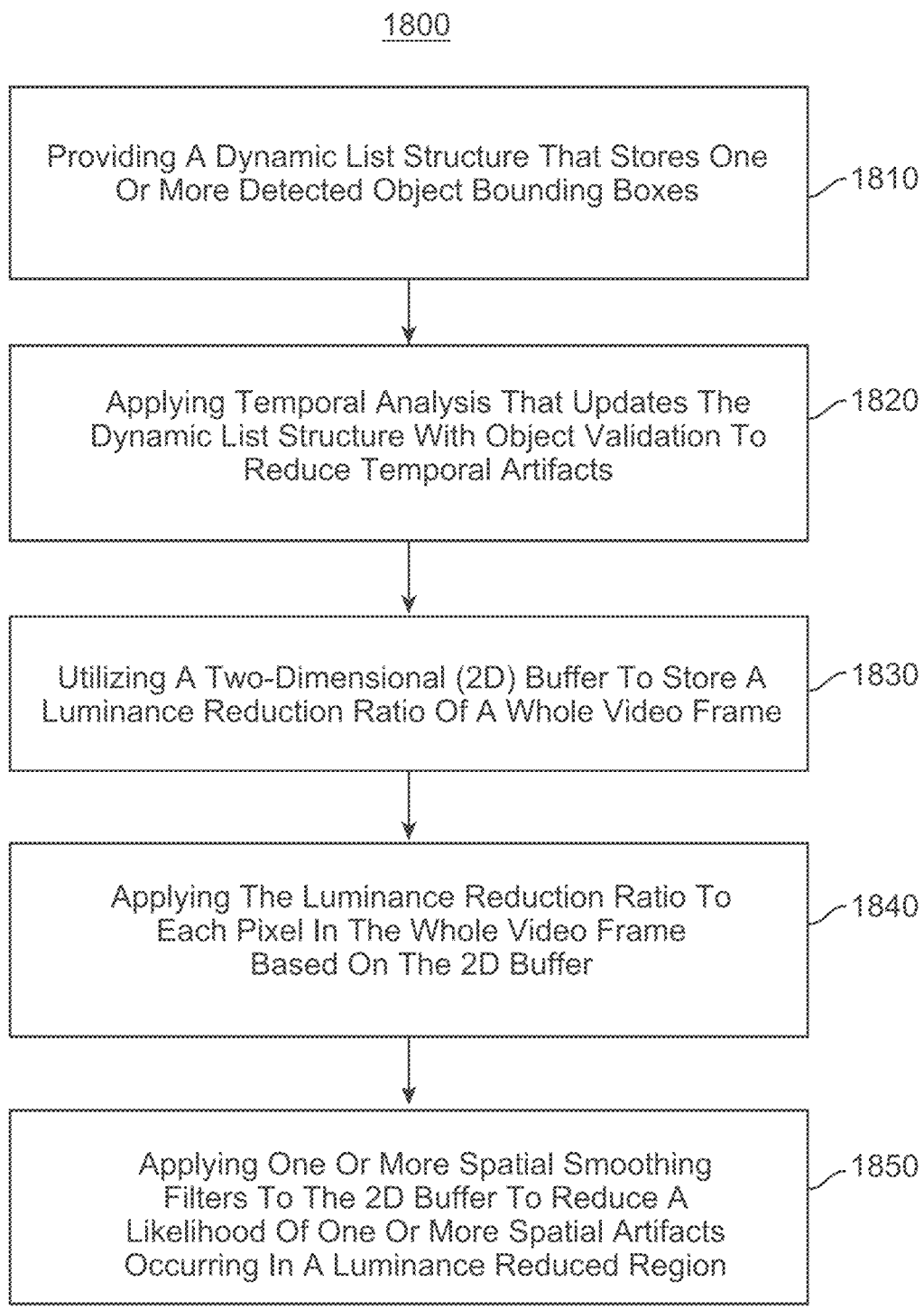
FIG. 18 illustrates a process for stationary luminance reduction, according to some embodiments.

FIG. 18 illustrates a process 1800 for stationary luminance reduction, according to some embodiments. In block 1810, process 1800 providing a dynamic list structure e.g., stable logo list 400, FIG. 4) that stores one or more detected object bounding boxes. In block 1820, process 1800 temporal analysis (e.g., dynamic logo list operation block 310, FIG. 3) is applied that updates the dynamic list structure with object validation (e.g., logo region validation processing 320, FIG. 3) to reduce temporal artifacts. In block 1830, process 1800 utilizes a 2D buffer (e.g., TLB 1215, FIG. 12) to store a luminance reduction ratio of a whole video frame. In block 1840, process 1800 the luminance reduction ratio (e.g., GTLB 1005, FIG. 10) is applied to each pixel in the whole video frame based on the 2D buffer. In block 1850, process 1800 applies one or more spatial smoothing filters to the 2D buffer to reduce a likelihood of one or more spatial artifacts occurring in a luminance reduced region (TLB smoother 510, FIG. 5).

In some embodiments, process 1800 further provides that the detected bounding boxes indicate stationary regions of the whole video frame that are targeted for luminance reduction.

In one or more embodiments, process 1800 further provides that the luminance reduction extends life of a SED by preventing burn-in.

In some embodiments, process 1800 additionally provides bounding boxes removed from the dynamic list structure indicate corresponding regions that are targeted for luminance recovery.

In one or more embodiments, process 1800 further provides that a GTLB (e.g., GTLB 1005, FIG. 10) tracks the luminance reduction ratio.

In some embodiments, process 1800 additionally provides adaptively setting a maximum value for the luminance reduction ratio based on logo position.

In one or more embodiments, process 1800 further provides the feature that a same amount of luminance reduction is applied irrespective of the logo size after application of a gaussian filter.

In some embodiments, process 1800 additionally provides adaptively setting a maximum luminance reduction limit based on logo size.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:
   providing a dynamic list structure that stores one or more detected object bounding boxes;
   applying temporal analysis that updates the dynamic list structure with object validation to reduce temporal artifacts;
   utilizing a two-dimensional (2D) buffer to store a luminance reduction ratio of a whole video frame;
   determining a maximum luminance reduction limit based on logo information;
   applying, based on the maximum luminance reduction limit, the luminance reduction ratio to each pixel in the whole video frame based on the 2D buffer; and
   applying one or more spatial smoothing filters to the 2D buffer to reduce a likelihood of one or more spatial artifacts occurring in a luminance reduced region.

2. The computer-implemented method of claim 1, wherein the detected bounding boxes indicate stationary regions of the whole video frame that are targeted for luminance reduction.

3. The computer-implemented method of claim 1, wherein the luminance reduction extends life of a self-emitting display (SED) by preventing burn-in.

4. The computer-implemented method of claim 1, wherein bounding boxes removed from the dynamic list structure indicate corresponding regions that are targeted for luminance recovery.

5. The computer-implemented method of claim 1, wherein a global target limit buffer tracks the luminance reduction ratio.

6. The computer-implemented method of claim 1, further comprising:
   adaptively setting the maximum luminance reduction limit based on the logo information;
   wherein the logo information comprises logo size.

7. The computer-implemented method of claim 6, wherein a same amount of luminance reduction is applied irrespective of the logo size after application of a gaussian filter.

8. The computer-implemented method of claim 1, further comprising:
   adaptively setting a maximum value for the luminance reduction ratio based on logo position.

9. A non-transitory processor-readable medium that includes a program that when executed by a processor performs prevention of self-emitting display (SED) burn-in, comprising:
   providing, by the processor, a dynamic list structure that stores one or more detected object bounding boxes;
   applying, by the processor, temporal analysis that updates the dynamic list structure with object validation to reduce temporal artifacts;
   utilizing, by the processor, a two-dimensional (2D) buffer to store a luminance reduction ratio of a whole video frame;
   determining, by the processor, a maximum luminance reduction limit based on logo information;
   applying, by the processor, based on the maximum luminance reduction limit, the luminance reduction ratio to each pixel in the whole video frame based on the 2D buffer; and
   applying, by the processor, one or more spatial smoothing filters to the 2D buffer to reduce a likelihood of one or more spatial artifacts occurring in a luminance reduced region.

10. The non-transitory processor-readable medium of claim 9, wherein the detected bounding boxes indicate stationary regions of the whole video frame that are targeted for luminance reduction, and the luminance reduction extends life of a self-emitting display (SED) by preventing burn-in.

11. The non-transitory processor-readable medium of claim 9, wherein bounding boxes removed from the dynamic list structure indicate corresponding regions that are targeted for luminance recovery, and a global target limit buffer tracks the luminance reduction ratio.

12. The non-transitory processor-readable medium of claim 9, further comprising:
   adaptively setting, by the processor, the maximum luminance reduction limit based on the logo information;
   wherein the logo information comprises logo size.

13. The non-transitory processor-readable medium of claim 12, wherein a same amount of luminance reduction is applied irrespective of the logo size after application of a gaussian filter.

14. The non-transitory processor-readable medium of claim 9, further comprising:
adaptively setting, by the processor, a maximum value for the luminance reduction ratio based on logo position.

15. An apparatus comprising:
a memory storing instructions; and
at least one processor executes the instructions including a process configured to:
providing a dynamic list structure that stores one or more detected object bounding boxes;
applying temporal analysis that updates the dynamic list structure with object validation to reduce temporal artifacts;
utilizing a two-dimensional (2D) buffer to store a luminance reduction ratio of a whole video frame;
determining a maximum luminance reduction limit based on logo information;
applying, based on the maximum luminance reduction limit, the luminance reduction ratio to each pixel in the whole video frame based on the 2D buffer; and
applying one or more spatial smoothing filters to the 2D buffer to reduce a likelihood of one or more spatial artifacts occurring in a luminance reduced region.

16. The apparatus of claim 15, wherein the detected bounding boxes indicate stationary regions of the whole video frame that are targeted for luminance reduction, and the luminance reduction extends life of a self-emitting display (SED) by preventing burn-in.

17. The apparatus of claim 15, herein bounding boxes removed from the dynamic list structure indicate corresponding regions that are targeted for luminance recovery, and a global target limit buffer tracks the luminance reduction ratio.

18. The apparatus of claim 15, further comprising:
adaptively setting, by the processor, the maximum luminance reduction limit based on the logo information;
wherein the logo information comprises logo size.

19. The apparatus of claim 18, wherein a same amount of luminance reduction is applied irrespective of the logo size after application of a gaussian filter.

20. The apparatus of claim 15, further comprising:
adaptively setting, by the processor, a maximum value for the luminance reduction ratio based on logo position.

* * * * *